United States Patent
Yang et al.

(10) Patent No.: US 8,199,622 B2
(45) Date of Patent: Jun. 12, 2012

(54) METHOD FOR EMULATING OPTICAL DISK, OPTICAL DISK DRIVE USING THE SAME, AND OPTICAL DISK INCLUDING SECURITY ZONE

(75) Inventors: In Chang Yang, Seoul (KR); Byung Ju Dan, Seoul (KR); Young Mo Goo, Seoul (KR); Byeong Rim Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 12/670,793

(22) PCT Filed: Jan. 21, 2008

(86) PCT No.: PCT/KR2008/000362
§ 371 (c)(1),
(2), (4) Date: Jan. 26, 2010

(87) PCT Pub. No.: WO2009/017289
PCT Pub. Date: Feb. 5, 2009

(65) Prior Publication Data
US 2010/0226222 A1      Sep. 9, 2010

(30) Foreign Application Priority Data

Jul. 27, 2007 (KR) .................. 10-2007-0075626
Nov. 13, 2007 (KR) .................. 10-2007-0115775

(51) Int. Cl.
*G11B 15/04* (2006.01)
(52) U.S. Cl. .................. 369/53.2; 369/53.37
(58) Field of Classification Search .......... None
See application file for complete search history.

(56) References Cited

U.S. PATENT DOCUMENTS
2001/0014883 A1   8/2001   Yamane et al.
(Continued)

FOREIGN PATENT DOCUMENTS
EP           0 475 639 A2    3/1992
(Continued)

*Primary Examiner* — Paul Huber
(74) *Attorney, Agent, or Firm* — Birch, Stewart, Kolasch & Birch, LLP

(57) ABSTRACT

Provided are a method for emulating a separate contents memory unit into an optical disk, an optical disk drive using the same, and an optical disk including a security zone. In the method, when an optical disk processing command from a host is present, whether an optical disk is present in the optical disk drive is judged. When the optical disk is not present in the optical disk drive as a result of the judgment, the contents memory unit is executed as a virtual optical disk. An application stored in the contents memory unit is displayed. The optical disk drive includes an optical disk storage unit, a contents memory unit, and a controller. The optical disk storage unit stores or reproduces contents using an optical disk. The contents memory unit stores contents therein and is executed as a virtual optical disk when the optical disk is not present. The controller controls the optical disk storage unit and the contents memory unit, and controls an access to be made, subject to the contents memory unit. The optical disk includes a fake zone that is accessible by all users without an authentication procedure, and a security zone that is accessible through the authentication procedure. Accordingly, a user can receive and use desired contents using the optical disk drive even when a disk is not present.

16 Claims, 6 Drawing Sheets

U.S. PATENT DOCUMENTS

| | | |
|---|---|---|
| 2004/0042363 A1* | 3/2004 | Kobayashi et al. .......... 369/53.21 |
| 2004/0083377 A1* | 4/2004 | Wu et al. ........................ 713/193 |
| 2006/0179263 A1 | 8/2006 | Song et al. |
| 2007/0159940 A1* | 7/2007 | Ijtsma et al. ................. 369/47.1 |

FOREIGN PATENT DOCUMENTS

| | | |
|---|---|---|
| JP | 4-88419 A | 3/1992 |
| JP | 4-111113 A | 4/1992 |
| JP | 4-192027 A | 7/1992 |
| JP | 2001-92602 A | 4/2001 |
| KR | 10-2004-0039679 A | 5/2004 |
| KR | 10-2006-0089491 A | 8/2006 |

* cited by examiner

[Fig. 1]
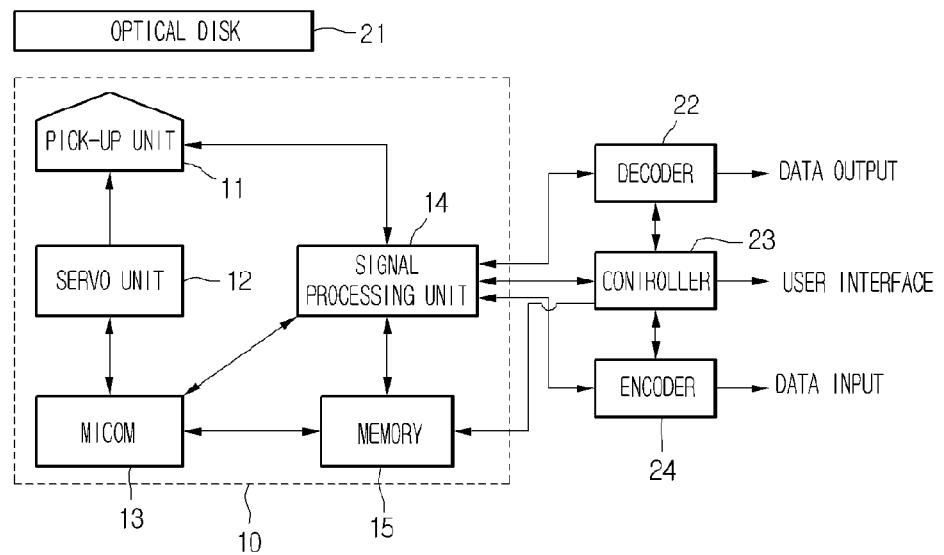
[Fig. 2]
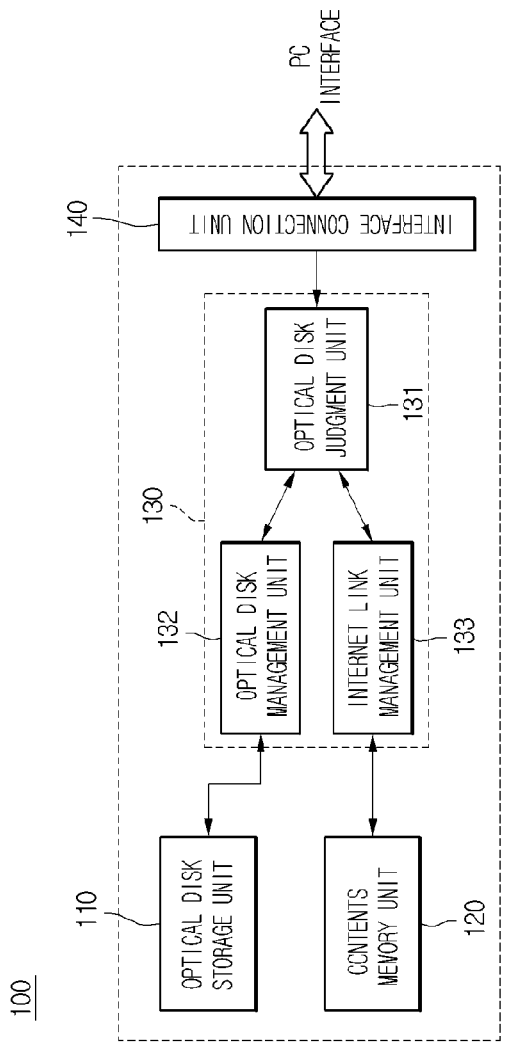

[Fig. 3]
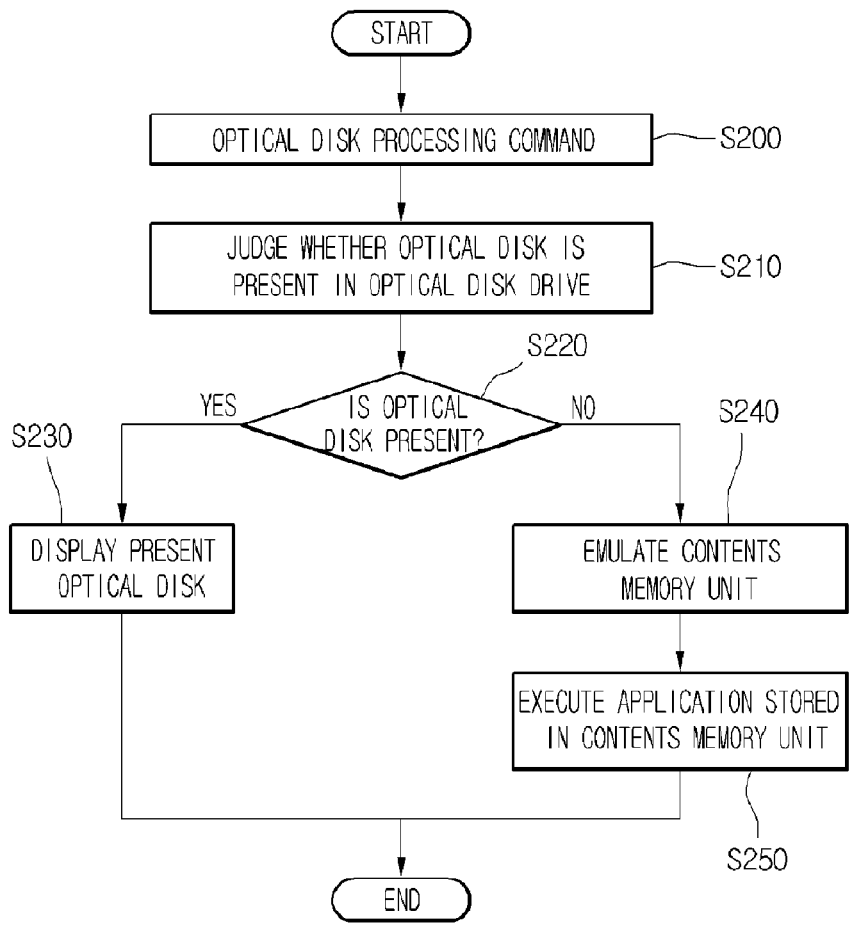
[Fig. 4]
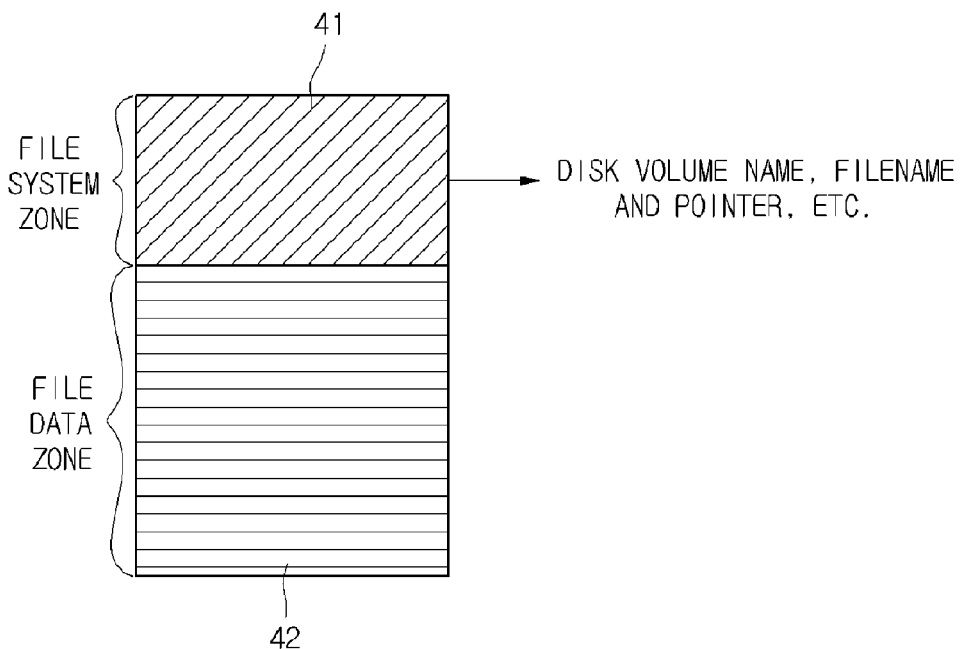

[Fig. 5]
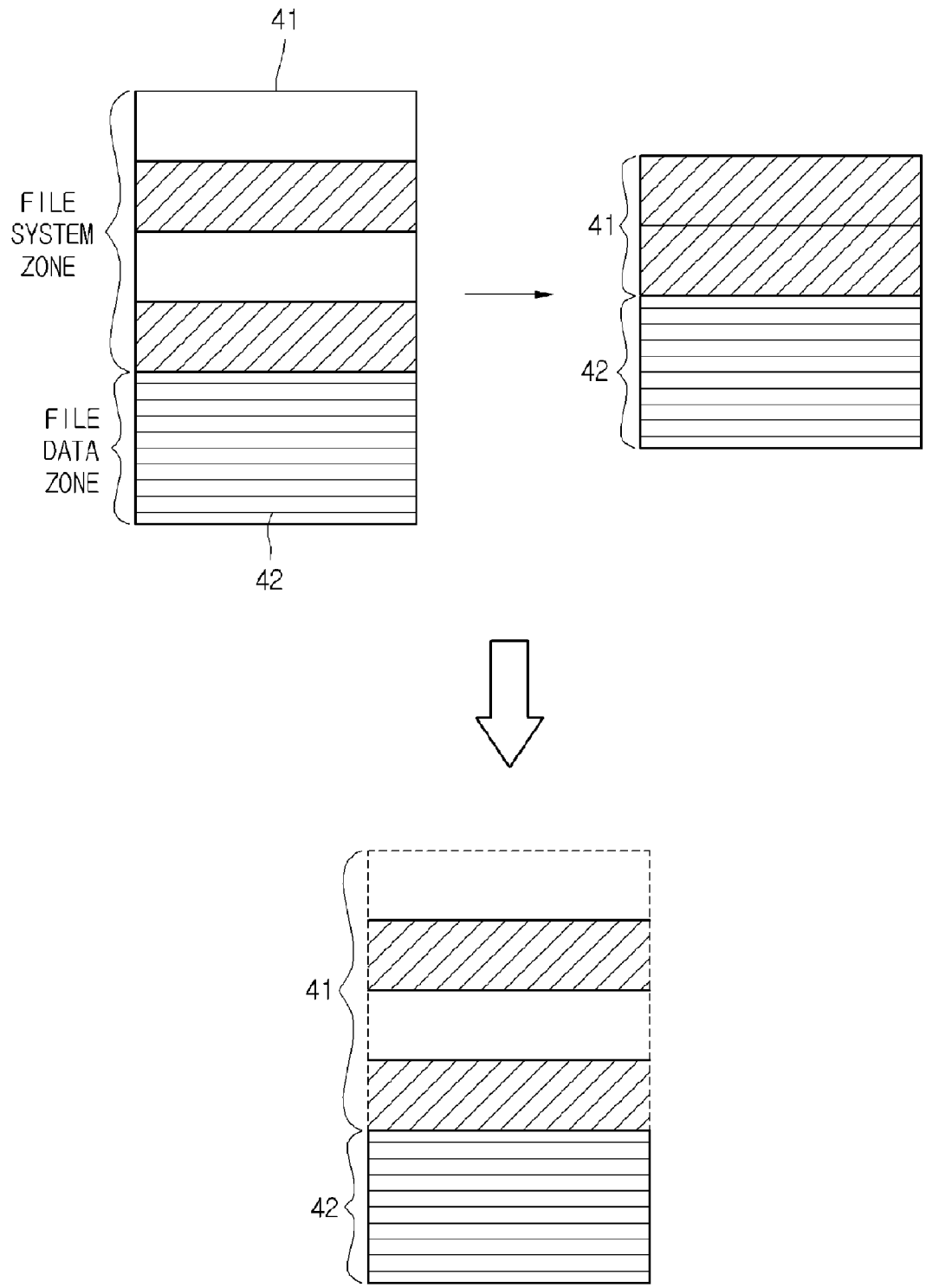

[Fig. 6]
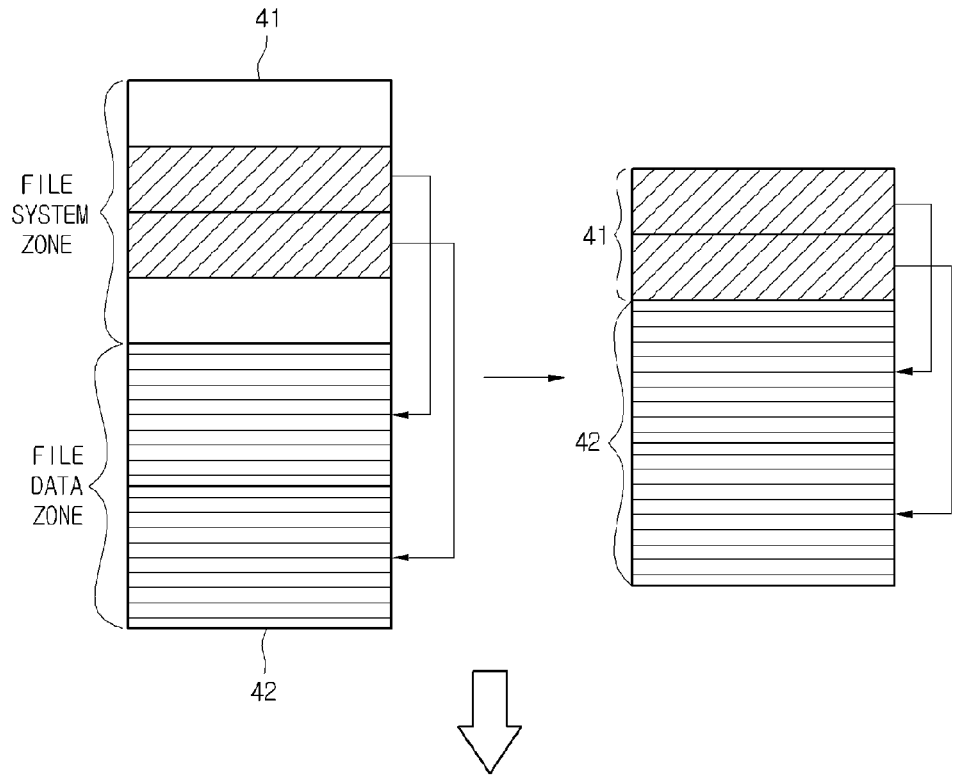
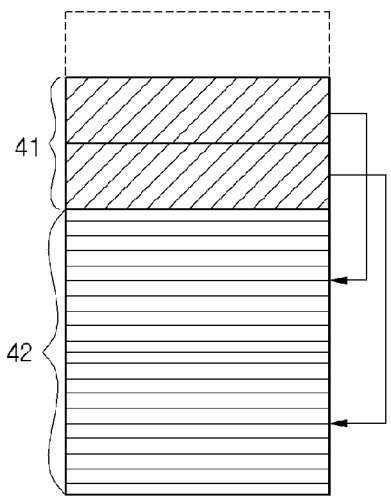
[Fig. 7]
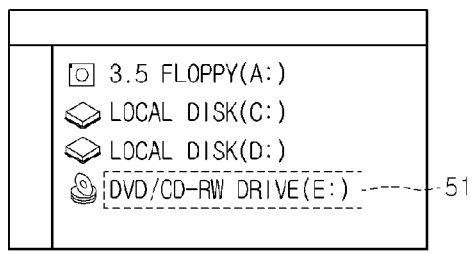

[Fig. 8]
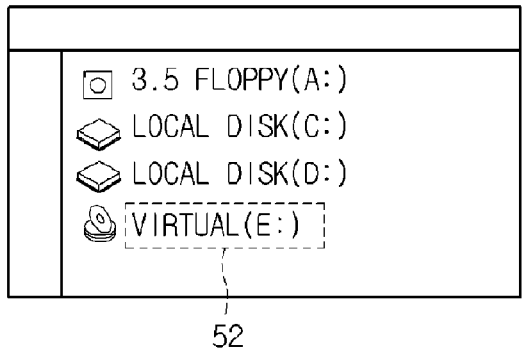
[Fig. 9]
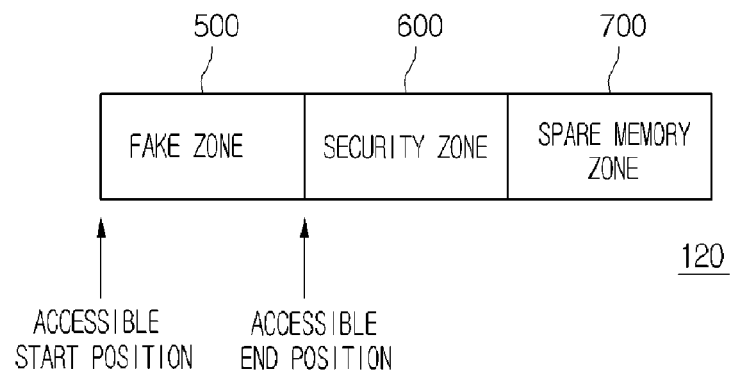
[Fig. 10]
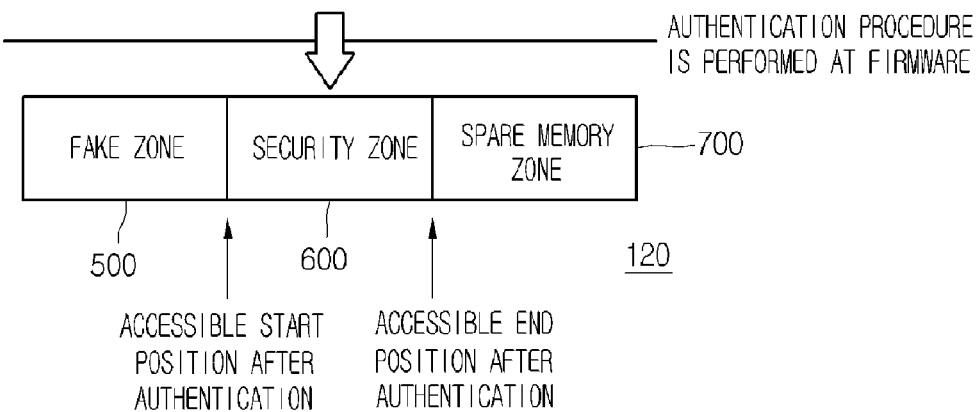
[Fig. 11]
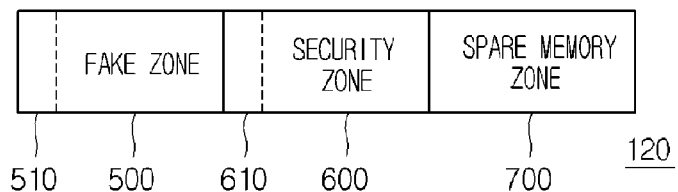

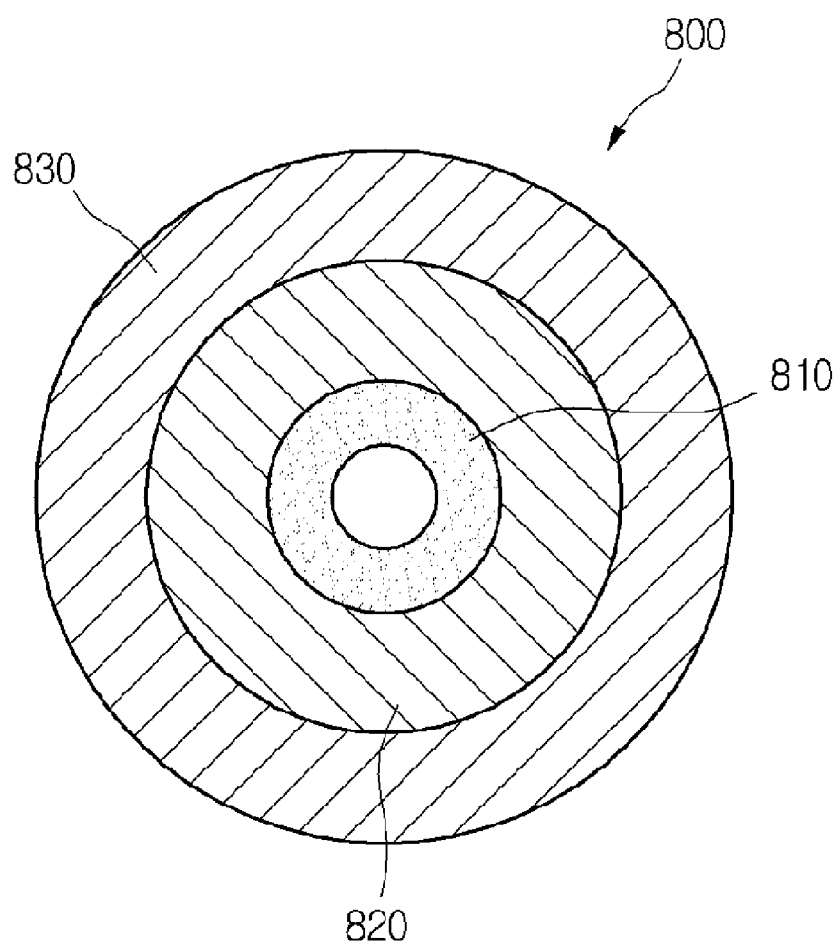
[Fig. 12]

METHOD FOR EMULATING OPTICAL DISK, OPTICAL DISK DRIVE USING THE SAME, AND OPTICAL DISK INCLUDING SECURITY ZONE

This application is a 371 of PCT/KR08/00362, filed Jan. 21, 2008.

TECHNICAL FIELD

The present disclosure relates to a method for emulating a separate contents memory as an optical disk, an optical disk drive using the same, and an optical disk including a security zone.

BACKGROUND ART

As demands for processing high-quality moving images increase, a high-capacity data storage optical disk is required. Consequently, high-density rewritable optical recording medium that can record and store high quality video and audio data for many hours is brought to the market, recently.

Examples of the high-density rewritable optical recording medium include a blue lay disk (BD), a high definition digital versatile disk (HD-DVD), etc. The DVD has an about 4.7 GB recording capacity and the BD has an about 25 GB recording capacity. After the BD standard has been introduced, the next generation high density/ultra miniature optical storage device has been developed. Examples of the next generation high density/ultra miniature optical storage device include technologies such as a super-lens, holography, near field recording, etc.

Recently, because these optical storage devices (e.g., compact disk (CD), DVD, BD, HD-DVD) are widely distributed, a home or office of company keeps several tens to hundreds of optical storage disks containing various contents.

FIG. 1 is a block diagram of a structure of a related art optical disk drive.

The related art optical disk drive includes an optical disk 21, a pick-up unit 11, a servo unit 12, a signal processing unit 14, a memory 15, and a micom 13. The optical disk 21 is a recording medium on which data are recorded, reproduced, and erased by a laser. The pick-up unit 11 records/reproduces management information including data recorded on the optical disk 21. The servo unit 12 controls operations of the pick-up unit 11. The signal processing unit 14 demodulates a reproduction signal received from the pick-up unit 11 into a desired signal value, or modulates a signal to be recorded into a signal having a form necessary for performing a recording operation on the optical disk 21 to transmit the signal. The memory 15 stores various information necessary for reproducing the optical disk 21. The micom 13 controls operations of the above components. The components form a recording/reproducing unit 10.

The pick-up unit 11 includes a laser light source such as a laser diode, a collimator lens, an objective lens driven by a focus actuator or a tracking actuator, a polarized beam splitter, an optical component such as a cylindrical lens, a photodetector converting light into an electrical signal, and a front monitor diode monitoring a laser output during a recording or reproducing operation.

The micom 13 detects reflected light from the optical disk 21, and calculates an amount of the reflected light through the detected reflected light to generate a radio frequency (RF) signal representing a total sum of the reflected light with respect to each area of photodiodes. Additionally, the micom 13 generates a focus error signal FE, which is a signal detecting an out-of-focus laser illuminated by the pick-up unit 11 through an astigmatism method. Additionally, the micom 13 generates a tracking error signal TE detecting an out-of-track laser illuminated by the pick-up unit 11 through a push-pull method.

The memory 15 stores various information necessary for reproducing the optical disk 21 and typically includes a random access memory (RAM) and a read only memory (ROM) to store a control program, a theoretical length of each pit and land, or existence probability in combination of each pit and land.

A controller 23 is responsible for controlling entire components.

A decoder 22 finally decodes output data in response to control of the controller 23 and then provides the decoded data to a user.

To record user desired data on a recoding medium, an encoder 24 converts an input signal into a signal of a predetermined format, e.g., a motion picture experts group 2 (MPEG2) transport stream, and then provides the converted signal to the signal processing unit 14 in response to control of the controller 23.

As described above, FIG. 1 illustrates components of recording and reproducing units of the related art optical disk drive. In relation to the reproducing of the optical disk, the optical disk 21, the recording/reproducing unit 10, and the decoder 22 are used. In relation to the recording of the optical disk, the recoding/reproducing unit 10, and the decoder 22 are used in response to control of the controller 23.

Since the optical disk drive reproduces/executes only the contents stored on the optical disk 21, there is inconvenience that the optical disk 21 should be replaced with a new optical disk when a user intends to execute other contents.

Also, since the capacity of the optical disk is limited, the optical disk cannot satisfy the demand of a user who desires to receive a great amount of contents.

Also, since a security method for an optical storage device is not sufficiently provided, data loss due to external trespass emerges as a serious limitation.

DISCLOSURE OF INVENTION

Technical Problem

Embodiments provide a method for emulating a separate contents memory as an optical disk and an optical disk drive that realize a virtual optical disk even when an optical disk is not present in the optical disk drive, and provide the virtual optical disk to a user.

Embodiments also provide a method for emulating a separate contents memory as an optical disk, an optical disk drive, and an optical disk that reinforce security to allow only a user who passes a predetermined authentication process to access a memory unit in which contents have been stored.

Technical Solution

To solve related art limitations, a separate contents memory unit is provided to an optical disk drive, and the contents memory unit is emulated (virtualized), so that a virtual optical disk can be executed.

The present disclosure relates to a method for emulating a separate contents memory as an optical disk, an optical disk drive using the same, and an optical disk including a security zone.

In one embodiment, a method for emulating an optical disk in an optical disk drive having a separate contents memory unit includes: when an optical disk processing command from a host is present, judging whether the optical disk is present in the optical disk drive; when the optical disk is not present in the optical disk drive as a result of the judgment, executing the contents memory unit as a virtual optical disk; and displaying an application stored in the contents memory unit.

The executing of the contents memory unit as the virtual optical disk may include: copying a file system of the optical disk to apply the copied file system to the contents memory unit; and performing the optical disk processing command from the host using an optical disk processing instruction.

The copying of the file system may include: one of directly copying information of the file system of the optical disk to apply the copied information to the contents memory unit, and compressing information of the file system of the optical disk to apply the copied information to the contents memory unit.

The contents memory unit may be recorded in the same data form as that of the optical disk, and executed as a virtual optical disk regardless of an operating system operating the optical disk drive.

The method may further include, when the optical disk is present in the optical disk drive, displaying an application list of the optical disk.

In another embodiment, an optical disk drive includes: an optical disk storage unit storing or reproducing contents using an optical disk; a contents memory unit storing contents therein and executed as a virtual optical disk when the optical disk is not present; and a controller controlling the optical disk storage unit and the contents memory unit, and controlling an access to be made, subject to the contents memory unit.

The controller may include: an optical disk management unit controlling the optical disk storage unit and performing an optical disk processing command of a host to return a result to the host; a contents memory management unit copying a file system of the optical disk to apply the file system to the contents memory unit so that the contents memory unit is executed as a virtual optical disk; and an optical disk judgment unit judging whether an optical disk is present when the optical disk processing command of the host is present.

When the optical disk judgment unit judges that the optical is not present, the contents memory management unit may execute the contents memory unit as a virtual optical disk. The contents memory management unit may copy and apply the file system of the optical disk to the contents memory unit, perform the optical disk processing command from the host using an optical disk processing instruction, and return one of a result and a state to the host in response to the command from the host.

The optical disk processing instruction may include an advanced technology attachment packet interface.

In further another embodiment, an optical disk includes: a fake zone that is accessible by all users without an authentication procedure; and a security zone that is accessible through the authentication procedure.

A program containing the authentication procedure may be embedded in the fake zone, and the fake zone and the security zone may use the same optical disk file system. When a user passes the authentication procedure, a start position that is accessible by the user may be changed into a start position of the security zone.

The details of one or more embodiments are set forth in the accompanying drawings and the description below. Other features will be apparent from the description and drawings, and from the claims.

Advantageous Effects

According to the present disclosure, a user can use a virtual optical disk even when an optical disk is not present in an optical disk drive, and the virtual optical disk provides the same physical characteristic that that of a real physical optical disk, so that user convenience can improve.

Also, since the virtual optical disk performs the same operation as that of a real physical optical disk, the virtual optical disk in a disk drive can be read by any device regardless of an operating system (OS).

Also, since an optical disk is realized in the form of a virtual optical disk, there is no limit in size, access speed, and no limitation such as recognition time of a physical disk.

BRIEF DESCRIPTION OF THE DRAWINGS

FIG. 1 is a block diagram illustrating the construction of a general optical disk drive.

FIG. 2 is a block diagram illustrating the construction of an optical disk drive according to an embodiment.

FIG. 3 is a flowchart of an optical disk emulation process according to an embodiment.

FIGS. 4 to 6 are schematic views explaining a process of copying a file system of an optical disk and applying the copied file system to a contents memory unit according to an embodiment.

FIG. 7 is an exemplary view illustrating a display screen for the case where an optical disk is not present according to a related art.

FIG. 8 is an exemplary view illustrating a display screen for the case where an emulation method is applied and an optical disk is not present according to an embodiment.

FIGS. 9 to 11 are schematic views illustrating the construction of a contents memory according to an embodiment.

FIG. 12 is a schematic view of an optical disk including a security zone according to an embodiment.

BEST MODE FOR CARRYING OUT THE INVENTION

Reference will now be made in detail to the embodiments of the present disclosure, examples of which are illustrated in the accompanying drawings.

FIG. 2 is a block diagram illustrating the construction of an optical disk drive according to an embodiment.

The optical disk drive 100 includes: an optical disk storage unit 110 storing or re-producing contents using an optical disk; a contents memory unit 120 storing contents therein and executed as a virtual optical disk when the optical disk is not present; and a controller 130 controlling the optical disk storage unit 110 and the contents memory unit 120, and controlling an access to be made, subject to the contents memory unit 120.

The controller 130 can include an optical disk management unit 132 controlling the optical disk storage unit 110 and performing an optical disk processing command of a host to return a result to the host; a contents memory management unit 133 copying a file system of an optical disk to apply the file system to the contents memory unit 120 so that the contents memory unit 120 is executed as a virtual optical disk; and an optical disk judgment unit 131 judging whether an optical disk is present when an optical disk processing command of the host is present.

Also, the optical disk drive 100 can further include an interface connection unit 140 providing an interface path to the host.

The optical disk drive 100 according to an embodiment can include not only the optical disk storage unit 110 reproducing/storing contents but also the separate contents memory unit 120 for emulation to an optical disk.

The contents memory unit 120 can include a separate memory unit, for example, a memory unit such as a RAM and a ROM, or can include a spare space of an internal memory of the optical disk drive.

Therefore, a limitation in the capacity of an optical disk can be solved by realizing the contents memory unit 120 as a virtual optical disk.

A user can access the optical disk drive 100 through a personal computer (PC) interface, and use the optical disk drive 100 through the interface connection unit 140.

When receiving a command from the host, the controller 130 controls the optical disk storage unit 110 or the contents memory unit 120.

More specifically, when an optical disk processing command from the host is received through the interface connection unit 140, the optical disk judgment unit 131 of the controller 130 judges whether an optical disk is present in the optical disk drive 100.

The optical disk judgment 131 can judge whether the optical disk is present using various methods. The various methods include a method of illuminating laser light and judging an optical disk is present when there is reflected light, and a method of rotating an optical disk and measuring a change in a rotation momentum to judge whether the optical disk is present.

When it is judged by the optical disk judgment unit 131 that an optical disk is present in the optical disk drive 100, the optical disk management unit 132 controls the optical disk storage unit 110 in response to a command from the host, and returns a result to the host.

When it is judged by the optical disk judgment unit 131 that an optical disk is not present in the optical disk drive 100, the contents memory management unit 133 controls the contents memory unit 120 to be executed as a virtual optical disk in response to a command from the host, and returns a result to the host.

A method for realizing the contents memory unit 120 as a virtual optical disk will be described in detail.

Virtualization according to an embodiment, that is, an emulation process means a series of processes executing the contents memory unit 120 as a virtual optical disk. Therefore, it is required to give the attribute of an optical disk to the contents memory unit 120.

For performing emulation, the same file system managing optical disk files should be applied to the contents memory unit 120, and also the same instructions processing the optical disk should be used for the contents memory unit 120.

There are characteristics to be checked to emulate the contents memory unit 120 as the optical disk. Examples of the characteristics include a disk characteristic (whether a disk has a ROM type or R/RW type), a disk size, a disk details (tracks, session information, etc.), and read/write information.

Also, as described above, to emulate the contents memory unit 120 as the optical disk, the same optical disk processing commands should be used for the contents memory unit 120.

For example, the optical disk processing command can include advanced technology attachment packet interface (ATAPI).

The ATAPI will be exemplarily described. Examples of the ATAPI include an instruction of Get Configuration, an instruction of Test Unit Ready, an instruction of Read Capacity, an instruction of Read TOC/PMA/ATPI or Read Disc Information, an instruction of Read Track Information, an instruction of Read, and instructions of Write, Verify, and Write and Verify. The instruction of Get Configuration returns profile information (e.g., type, size, power control characteristic) of the contents memory unit 120 as virtual disk information. The instruction of Test Unit Ready returns a drive ready state. The instruction of Read Capacity returns the maximum capacity of a disk. The instruction of Read TOC/PMA/ATPI or Read Disc Information returns information of virtually set track/session. The instruction of Read Track Information returns detail information of a track. The instruction of Read maps a predetermined address zone of the contents memory unit 120 to a predetermined zone of an optical disk, so that the predetermined address zone can be recognized as if it were an optical disk. The instructions of Write, Verify, and Write and Verity map a predetermined address zone of the contents memory unit 120 to a predetermined zone of an optical disk, so that the predetermined address zone is emulated as a zone for performing a data writing operation.

The above-described commands are exemplary for explanation of the present disclosure but the present disclosure is not limited thereto.

Therefore, when the optical disk processing command from the host is present and it is judged by the optical disk judgment unit 131 that an optical disk is not present, the contents memory management unit 133 can return a state or a result in response to the optical disk processing instruction.

As described above, the emulation is performed on the contents memory unit 120 stored inside the optical disk drive, so that the contents memory unit 120 is performed as a virtual disk. Therefore, the contents memory unit 120 can be given a physical characteristic regardless of an operating system operating the optical disk drive.

A method for copying and apply the file system of an optical disk to the contents memory unit 120 will be described with reference to FIGS. 4 to 6.

FIG. 3 is a flowchart of an optical disk emulation process according to an embodiment.

When an optical disk processing command from the host is present (S200), the optical disk judgment unit judges whether an optical disk is present in the optical disk drive (S210 and S220). When the optical disk is present in the optical disk drive as a result of the judgment, the optical disk is controlled by the optical disk management unit, and the present optical disk is displayed (S230).

When the optical disk is not present in the optical disk drive as a result of the judgment, the contents memory management unit emulates the contents memory unit according to an embodiment (S240). Next, applications stored in the contents memory unit are displayed (S250) to allow desired contents to be executed.

FIGS. 4 to 6 are schematic views explaining a process of copying a file system of an optical disk and applying the copied file system to a contents memory unit according to an embodiment.

FIG. 4 is a schematic view of a general file system of an optical disk.

The file system used for a general optical disk may be ISO9660, universal disk format (UDF), and UDF-bridge. The file system can be divided into a file system zone 41 and a file data zone 42.

A representative name of a disk, a disk size, and a pointer indicating a data position can be stored in the file system zone 41. Real data can be stored in the file data zone 42.

Generally, the contents of the file system of an optical disk can be simply and directly copied, and applied to the contents memory unit. However, the above method has a limitation of requiring a large data capacity due to requirements of the file system of the optical disk even for a small capacity of file data.

Therefore, a method for compressing and applying the information of the file system of an optical disk to the contents memory unit can be used, which will be described with reference to FIGS. 5 and 6.

FIG. 5 illustrates a file system copying method according to an embodiment. Referring to FIG. 5, the file system of an optical disk includes a plurality of blocks (not shaded portions) filled with zero.

Therefore, the file system can be copied using a small memory space by extracting only actually existing data blocks and not extracting blocks filled with zero from the file system zone.

Next, the file system of the optical disk can be completely copied using only a small memory space and can be applied to the contents memory unit by allocating a virtual zero-block space while emulation is performed.

That is, in the emulated virtual disk, when a No. 0 block is read, for example, a value of zero is returned because it is a zone where no real data exist. When a No. 1 block is read, it is converted into a zone where real data exist, so that it is changed into a real data position and the data are read and returned.

FIG. 6 illustrates a file system copying method according to another embodiment. Referring to FIG. 6, the file system of an optical disk includes a plurality of blocks (not shaded portions) filled with zero.

Therefore, the file system can be copied using a small memory space by extracting only actually existing data blocks and not extracting blocks filled with zero from the file system zone.

Next, a virtual zero block space is allocated while emulation is performed. Unlike the case shown in FIG. 4B, since a zero block at the lowermost end of the file system zone does not need to be accessed, it does not need to be realized upon virtualization. Therefore, in this case, management can be facilitated by compressing the file system through update of position information using address shift, and consequently reducing a shift distance upon address mapping.

FIG. 7 is an exemplary view illustrating a display screen for the case where an optical disk is not present according to a related art, and FIG. 8 is an exemplary view illustrating a display screen for the case where an emulation method is applied and an optical disk is not present according to an embodiment.

When an optical disk is not present in an optical disk drive, a related art optical disk drive displays DVD/CD-RW drive (E:) 51 on the screen of a PC to inform an empty state as illustrated in FIG. 7.

However, an optical disk drive using emulation according to an embodiment, an internal contents memory unit can be emulated and realized as if an optical disk were present even when the optical disk is not present.

That is, referring to FIG. 8, a virtual optical disk can be realized. FIG. 8 exemplarily illustrates VIRTUAL 52. Instead of this, a disk volume label name of the file system zone can be displayed.

FIGS. 9 and 11 are schematic views illustrating the construction of a contents memory according to an embodiment.

FIG. 9 is a schematic view of the contents memory unit 120 before a user authentication procedure is performed according to an embodiment.

To reinforce security while maintaining an existing file system, the contents memory unit 120 of the present disclosure can include a fake zone 500 and a security zone 600.

Also, a portion of the contents memory unit 120 that excludes the fake zone 500 and the security zone 600 exists as a spare memory zone 700.

The contents memory unit can include only the fake zone 500, include only the security zone 600, and include a proper combination of the fake zone 500 and the security zone 600.

The fake zone 500 is a zone that is accessible by all users, and the security zone 600 is a zone that is accessible only through user authentication. The security zone 600 can include a plurality of consecutive zones.

Since a program containing an authentication procedure can be embedded in the fake zone 500, a process of having to install the authentication procedure is omitted, so that user convenience improves.

Referring to FIG. 9, a zone that can be accessed by a user before the authentication of the user is performed is only the fake zone 500.

To use various contents embedded in the security zone 600, the user passes through the program containing the authentication procedure and embedded in the fake zone 500.

FIG. 10 is a schematic view of the contents memory unit 120 after the user authentication procedure has been performed according to an embodiment. When the user passes through the user authentication procedure through a firmware, a start position that is accessible by the user is changed into a start position of the security zone 600.

Therefore, the user can access not only the fake zone 500 but also the security zone 600.

FIG. 11 is a schematic view illustrating the construction of the contents memory unit 120 according to an embodiment. The file system table of the file system (for example, ISO9660 or UDF) of an optical storage medium is stored in a portion 510 or 610 of the fake zone 500 or the security zone 600.

Referring to FIG. 11, the fake zone 500 and the security zone 600 have the same file system configuration, and only a start point of a position accessible by a user is simply changed. Therefore, the existing format is maintained and a data zone can be protected.

In the case where the security zone is set in the contents memory unit to store various contents as described above, data cannot be viewed at all without authentication. Accordingly, a separate encoding process does not need to be performed, which provides convenience to a user.

FIG. 12 is a schematic view of an optical disk 800 including a security zone according to an embodiment. The optical disk 800 including the fake zone 810 and the security zone 820 is illustrated in FIG. 12. The fake zone 810 is a zone accessible by all users upon insertion of a disk. The security zone 820 is a zone that can be accessed only when the user passes through a predetermined authentication procedure. The security zone can include a plurality of consecutive zones. Since a program containing an authentication procedure is embedded in the fake zone 810, a process of having to install the authentication procedure is omitted, so that user convenience improves.

Similarly to the memory unit of the optical disk drive, the fake zone 810 and the security zone 820 of the optical disk use the same file system. Also, when a user passes through the authentication procedure, a start position that is accessible by the user is changed into a start position of the security zone 600, so that the user can recognize the security zone as if it were the exiting disk.

A rest portion excluding the fake zone 810 and the security zone 820 is a spare memory zone 830. The spare memory zone 830 denotes an extra memory zone that can be used for various purposes.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method for emulating an optical disk in an optical disk drive having a separate contents memory unit, the method comprising:
    judging whether the optical disk is present in the optical disk drive when an optical disk processing command from a host is present;
    executing the separate contents memory unit as a virtual optical disk when the optical disk is not present in the optical disk drive as a result of the judgment, wherein the separate contents memory unit includes a file system area storing file system data for the virtual optical disk and a file data area storing contents for the virtual optical disk, and the file system area does not include one or more data blocks filled with zero among data blocks for the file system data for the virtual optical disk;
    returning a value of zero when the one or more data blocks filled with zero are read; and
    displaying an application stored in the separate contents memory unit.

2. The method according to claim 1, wherein the executing of the separate contents memory unit as the virtual optical disk comprises:
    copying a file system of the optical disk to apply the copied file system to the separate contents memory unit; and
    performing the optical disk processing command from the host using an optical disk processing instruction.

3. The method according to claim 2, wherein the copying of the file system comprises one of directly copying information of the file system of the optical disk to apply the copied information to the separate contents memory unit, and compressing information of the file system of the optical disk to apply the copied information to the separate contents memory unit.

4. The method according to claim 1, wherein the separate contents memory unit is recorded in the same data form as that of the optical disk.

5. The method according to claim 1, wherein the separate contents memory unit is executed as a virtual optical disk regardless of an operating system operating the optical disk drive.

6. The method according to claim 1, further comprising displaying an application list of the optical disk when the optical disk is present in the optical disk drive.

7. An optical disk drive comprising:
    an optical disk storage unit storing or reproducing contents using an optical disk;
    a contents memory unit executed as a virtual optical disk when the optical disk is not present, wherein the contents memory unit includes a file system area storing file system data for the virtual optical disk and a file data area storing contents for the virtual optical disk, and the file system area does not include one or more data blocks filled with zero among data blocks for the file system data for the virtual optical disk; and
    a controller having access to the contents memory unit when an optical disk processing command from a host is present and the optical disk is not present in the optical disk storage unit,
    wherein the controller returns a value of zero when the one or more data blocks filled with zero are read.

8. The optical disk drive according to claim 7, wherein the controller comprises:
    an optical disk management unit controlling the optical disk storage unit and performing the optical disk processing command of the host to return a result to the host;
    a contents memory management unit copying a file system of the optical disk to apply the file system to the contents memory unit so that the contents memory unit is executed as the virtual optical disk; and
    an optical disk judgment unit judging whether an optical disk is present when the optical disk processing command of the host is present.

9. The optical disk drive according to claim 8, wherein when the optical disk judgment unit judges whether an optical disk is present, the controller controls the present optical disk to be executed.

10. The optical disk drive according to claim 8, wherein when the optical disk judgment unit judges that the optical is not present, the contents memory management unit executes the contents memory unit as the virtual optical disk.

11. The optical disk drive according to claim 10, wherein the contents memory management unit copies and applies the file system of the optical disk to the contents memory unit, performs the optical disk processing command from the host using an optical disk processing instruction, and returns one of a result and a state to the host in response to the optical disk processing command from the host.

12. The optical disk drive according to claim 11, wherein the optical disk processing instruction comprises an advanced technology attachment packet interface.

13. The optical disk drive according to claim 11, wherein the contents memory management unit directly copies information of the file system of the optical disk to apply the copied information to the contents memory unit, or compresses the information of the file system of the optical disk to apply the copied information to the contents memory unit.

14. The optical disk drive according to claim 11, wherein information of the file system of the optical disk is compressed by removing the one or more data blocks filled with zero from the information of the file system of the optical disk, and using only data blocks that are not filled with zero.

15. The optical disk drive according to claim 7, wherein the contents memory unit is recorded in the same data form as that of the optical disk.

16. The optical disk drive according to claim 7, wherein the contents memory unit is executed as the virtual optical disk regardless of an operating system operating the optical disk drive.

* * * * *